(12) United States Patent
Moon et al.

(10) Patent No.: US 12,175,706 B2
(45) Date of Patent: Dec. 24, 2024

(54) METHOD AND APPARATUS WITH GLOBAL LOCALIZATION

(71) Applicant: Samsung Electronics Co., Ltd., Suwon-si (KR)

(72) Inventors: Hyewon Moon, Seongnam-si (KR); Jiyeon Kim, Hwaseong-si (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 17/699,657

(22) Filed: Mar. 21, 2022

(65) Prior Publication Data

US 2023/0114734 A1     Apr. 13, 2023

(30) Foreign Application Priority Data

Oct. 7, 2021    (KR) ........................ 10-2021-0133117

(51) Int. Cl.
     *G06T 7/73*      (2017.01)
     *G06N 3/08*      (2023.01)

(52) U.S. Cl.
     CPC ................. *G06T 7/74* (2017.01); *G06N 3/08* (2013.01); *G06T 2207/20081* (2013.01); *G06T 2207/20084* (2013.01); *G06T 2207/30244* (2013.01)

(58) Field of Classification Search
     CPC ............. G06T 7/74; G06T 2207/20081; G06T 2207/20084; G06T 2207/30244; G06N 3/08

(Continued)

(56) References Cited

U.S. PATENT DOCUMENTS 9,940,553 B2    4/2018   Shotton et al.
10,474,880 B2   11/2019   Yu et al.
(Continued)

FOREIGN PATENT DOCUMENTS

CN         115953464 A   *   4/2023  ............ G06N 3/045
KR      10-1894278 B1       9/2018
(Continued)

OTHER PUBLICATIONS

Ganin, Yaroslav, et al. "Unsupervised Domain Adaptation by Backpropagation." *Proceedings of the 32nd International conference on machine learning PMLR* vol. 37, Lille, France, 2015 (10 pages in English).

Kendall, Alex, et al.. "PoseNet: A Convolutional Network for Real-Time 6-DOF Camera Relocalization." *Proceedings of the IEEE international conference on computer vision* 2015 (9 pages in English).

(Continued)

*Primary Examiner* — Quang N Vo
(74) *Attorney, Agent, or Firm* — NSIP Law

(57) ABSTRACT

A method with global localization includes: extracting a feature by applying an input image to a first network; estimating a coordinate map corresponding to the input image by applying the extracted feature to a second network; and estimating a pose corresponding to the input image based on the estimated coordinate map, wherein either one or both of the first network and the second network is trained based on either one or both of: a first generative adversarial network (GAN) loss determined based on a first feature extracted by the first network based on a synthetic image determined by three-dimensional (3D) map data and a second feature extracted by the first network based on a real image; and a second GAN loss determined based on a first coordinate map estimated by the second network based on the first feature and a second coordinate map estimated by the second network based on the second feature.

21 Claims, 10 Drawing Sheets

(58) Field of Classification Search
USPC ........................................................ 382/103
See application file for complete search history.

(56) References Cited

U.S. PATENT DOCUMENTS

| | | | |
|---|---|---|---|
| 10,916,046 B2 | 2/2021 | Guay et al. | |
| 10,916,050 B1 | 2/2021 | Lin et al. | |
| 11,107,228 B1 | 8/2021 | Shrivastava | |
| 2004/0095344 A1 | 5/2004 | Dojyun et al. | |
| 2020/0302628 A1* | 9/2020 | DeTone | G06V 10/82 |
| 2021/0103776 A1* | 4/2021 | Jiang | G06T 19/20 |
| 2021/0180942 A1 | 6/2021 | Lin et al. | |

FOREIGN PATENT DOCUMENTS

| | | |
|---|---|---|
| KR | 10-2019-0091806 A | 8/2019 |
| KR | 10-2020-0046189 A | 5/2020 |
| KR | 10-2119056 B1 | 6/2020 |
| KR | 10-2021-0032678 A | 3/2021 |
| KR | 10-2240885 B1 | 4/2021 |
| KR | 10-2245220 B1 | 4/2021 |
| KR | 10-2261869 B1 | 6/2021 |

OTHER PUBLICATIONS

Brachmann, Eric, et al. "Learning Less is More—6D Camera Localization via 3D Surface Regression." *Proceedings of the IEEE Conference on Computer Vision and Pattern Recognition* 2018 (9 pages in English).

Sarlin, Paul-Edouard, et al. "From Coarse to Fine: Robust Hierarchical Localization at Large Scale." *Proceedings of the IEEE/CVF Conference on Computer Vision and Pattern Recognition* 2019 (10 pages in English).

Di Mauro, Daniele, et al. "Unsupervised Domain Adaptation for 6DOF Indoor Localization." *In Proceedings of the 16$^{th}$ International Joint Conference on Computer Vision, Imaging and Computer Graphics Theory and Applications VISIGRAPP*, vol. 5, DOI: 10.5220/0010333409540961, ISBN: 978-989-758-488-6, 2021 (8 Pages in English).

Yang, Chenhao, et al. "Relative camera pose estimation using synthetic data with domain adaptation via cycle-consistent adversarial networks." Journal of Intelligent & Robotic Systems 102.4 (2021): 1-17.

Extended European search report issued on Dec. 5, 2022, in counterpart European Patent Application No. 22175221.5 (8 pages in English).

* cited by examiner

METHOD AND APPARATUS WITH GLOBAL LOCALIZATION

CROSS-REFERENCE TO RELATED APPLICATIONS

This application claims the benefit under 35 USC § 119(a) of Korean Patent Application No. 10-2021-0133117, filed on Oct. 7, 2021 in the Korean Intellectual Property Office, the entire disclosure of which is incorporated herein by reference for all purposes.

BACKGROUND

1. Field

The following disclosure relates to an apparatus and method with global localization.

2. Description of Related Art

Global localization technology refers to a technology of estimating a six-degrees-of-freedom (6DoF) pose of a device based on map information associated with a target space when the map information is known in advance. Through the global localization technology, an absolute position of the device may be estimated based on coordinates of a determined map. The global localization technology may be used to initially estimate a pose of the device in the target space or used in a situation where tracking of a position of the device after initially estimating the pose is lost. The global localization technology using images captured or sensed by the device may include, for example, an image retrieval scheme of searching for at least one image matching a query image and estimating pose information corresponding to the found image, a direct pose regression scheme of directly regressing a pose from a query image using a pose regression deep network, a sparse feature matching scheme of storing feature information in a point cloud constituting a three-dimensional (3D) map, of matching the feature information to two-dimensional (2D) features of a query image, and of searching for a 2D-3D matching relationship, and a scene coordinate regression scheme of obtaining a 2D-3D matching relationship as a regression issue.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a method with global localization includes: extracting a feature by applying an input image to a first network; estimating a coordinate map corresponding to the input image by applying the extracted feature to a second network; and estimating a pose corresponding to the input image based on the estimated coordinate map, wherein either one or both of the first network and the second network is trained based on either one or both of: a first generative adversarial network (GAN) loss determined based on a first feature extracted by the first network based on a synthetic image determined by three-dimensional (3D) map data and a second feature extracted by the first network based on a real image; and a second GAN loss determined based on a first coordinate map estimated by the second network based on the first feature and a second coordinate map estimated by the second network based on the second feature.

Either one or both of the first network and the second network may be trained further based on either one or both of: a first loss determined based on the first coordinate map and ground truth data corresponding to the synthetic image; and a second loss determined based on a first pose estimated based on the first coordinate map and the ground truth data corresponding to the synthetic image.

The ground truth data may include a pose of a virtual camera that captures the synthetic image and 3D coordinate data corresponding to each pixel of the synthetic image.

The pose may include a six-degrees-of-freedom (6DoF) pose of a device that captures the input image.

In another general aspect, one or more embodiments include a non-transitory computer-readable storage medium storing instructions that, when executed by one or more processors, configure the one or more processors to perform any one, any combination, or all operations and methods described herein.

In another general aspect, a method with global localization includes: determining a synthetic data set based on three-dimensional (3D) map data, the synthetic data set comprising a synthetic image captured by a virtual camera corresponding to an arbitrary pose and 3D coordinate data corresponding to each pixel of the synthetic image; determining a first generative adversarial network (GAN) loss based on a first feature determined by applying the synthetic image to the first network and a second feature determined by applying a real image captured by a real camera to the first network; determining a second GAN loss based on a first coordinate map determined by applying the first feature to the second network and a second coordinate map determined by applying the second feature to the second network; determining a first loss based on the first coordinate map and the 3D coordinate data corresponding to the synthetic image; determining a second loss based on a first pose estimated based on the first coordinate map and a pose of the virtual camera; and training either one or both of the first network and the second network based on any one or any combination of any two or more of the first loss, the second loss, the first GAN loss, and the second GAN loss.

The determining of the synthetic data set further may include: extracting the first feature by applying the synthetic image to the first network; estimating the first coordinate map corresponding to each pixel of the synthetic image by applying the extracted first feature to the second network; estimating a first pose corresponding to the synthetic image based on the estimated first coordinate map; extracting the second feature by applying the real image to the first network; and estimating the second coordinate map corresponding to each pixel of the synthetic image by applying the extracted second feature to the second network.

The training of the either one or both of the first network and the second network may include training the first network and a first discriminator based on the first GAN loss, the first discriminator being configured to discriminate between the first feature extracted from the synthetic image and the second feature extracted from the real image.

The training of the either one or both of the first network and the second network may include training the second network and a second discriminator based on the second GAN loss, the second discriminator being configured to discriminate between the first coordinate map estimated from the synthetic image and the second coordinate map estimated from the real image.

The training of the either one or both of the first network and the second network may include iteratively back-propagating a gradient determined based on the first loss to the first network and the second network.

The training of the either one or both of the first network and the second network may include iteratively back-propagating a gradient determined based on the second loss to the first network and the second network.

The method may include, in response to the training of the either one or both of the first network and the second network: extracting a feature by applying an input image to the first network; estimating a coordinate map corresponding to the input image by applying the extracted feature to the second network; and estimating a pose corresponding to the input image based on the estimated coordinate map.

In another general aspect, an apparatus with global localization includes: one or more processors configured to: extract a feature by applying an input image to a first network of a global localization model; estimate a coordinate map of the input image by applying the extracted feature to a second network of the global localization model; and estimate a pose corresponding to a global localization result by applying the estimated coordinate map to a pose estimator of the global localization model, wherein the global localization model is generated by: determining a synthetic data set based on three-dimensional (3D) map data, the synthetic data set comprising a synthetic image captured by a virtual camera corresponding to an arbitrary pose and 3D coordinate data corresponding to each pixel of the synthetic image; and iteratively back-propagating a gradient determined based on one or more losses associated with the global localization model, to update parameters of the first network and the second network; and wherein a loss associated with the global localization model may include either one or both of: a first generative adversarial network (GAN) loss determined based on a first feature extracted by the first network based on the synthetic image and a second feature extracted by the first network based on a real image; and a second GAN loss determined based on a first coordinate map estimated by the second network based on the first feature and a second coordinate map estimated by the second network based on the second feature.

The loss associated with the global localization model further may include: a first loss determined based on the first coordinate map and ground truth data corresponding to the synthetic image; and a second loss determined based on a first pose estimated by the pose estimator based on the first coordinate map, and the ground truth data corresponding to the synthetic image.

The iteratively back-propagating of the gradient may include: iteratively back-propagating a gradient determined by inputting the first feature to a first discriminator to the first discriminator and the first network, based on the first GAN loss; and iteratively back-propagating a gradient determined by inputting the second feature to the first discriminator to the first discriminator and the first network, based on the first GAN loss, and the first discriminator may include a neural network configured to output a value indicating the synthetic image based on the first feature extracted from the synthetic image and output a value indicating the real image based on the second feature extracted from the real image.

The iteratively back-propagating of the gradient may include: iteratively back-propagating a gradient determined by inputting the first coordinate map to a second discriminator to the second discriminator and the second network, based on the second GAN loss; and iteratively back-propagating a gradient determined by inputting the second coordinate map to the second discriminator to the second discriminator and the second network, based on the second GAN loss, and the second discriminator may include a neural network configured to output a value indicating the synthetic image based on the first coordinate map estimated from the synthetic image and output a value indicating the real image based on the second coordinate map estimated from the real image.

The apparatus may include a memory storing instructions that, when executed by the one or more processors, configure the one or more processors to perform the extracting of the feature, the estimating of the coordinate map, and the estimating of the pose.

In another general aspect, a non-transitory computer-readable storage medium may store a global localization model, wherein the global localization model is generated by: determining a synthetic image captured by a virtual camera corresponding to an arbitrary pose and three-dimensional (3D) coordinate data corresponding to each pixel of the synthetic image, based on 3D map data; iteratively back-propagating a gradient determined based on one or more losses associated with the global localization model, to update parameters of a neural network included in the global localization model; and storing the parameters of the neural network in the non-transitory computer-readable storage medium, wherein the neural network included in the global localization model comprises: a first network configured to extract a feature of an input image; and a second network configured to estimate a coordinate map of the input image based on an output of the first network, and wherein the one or more losses associated with the global localization model may include either one or both of: a first generative adversarial network (GAN) loss determined based on a first feature extracted by the first network based on the synthetic image and a second feature extracted by the first network based on a real image; and a second GAN loss determined based on a first coordinate map estimated by the second network based on the first feature and a second coordinate map estimated by the second network based on the second feature.

The one or more losses associated with the global localization model further may include: a first loss determined based on the first coordinate map and ground truth data corresponding to the synthetic image; and a second loss determined based on a first pose estimated based on the first coordinate map, and the ground truth data corresponding to the synthetic image.

The iteratively back-propagating of the gradient may include: iteratively back-propagating a gradient determined by inputting the first feature to a first discriminator to the first discriminator and the first network, based on the first GAN loss; and iteratively back-propagating a gradient determined by inputting the second feature to the first discriminator to the first discriminator and the first network, based on the first GAN loss, and the first discriminator may include a neural network configured to output a value indicating the synthetic image based on the first feature extracted from the synthetic image and output a value indicating the real image based on the second feature extracted from the real image.

The iteratively back-propagating of the gradient may include: iteratively back-propagating a gradient determined by inputting the first coordinate map to a second discriminator to the second discriminator and the second network, based on the second GAN loss; and iteratively back-propagating a gradient determined by inputting the second coordinate map to the second discriminator to the second discriminator and the second network, based on the second GAN loss, and the second discriminator may include a neural network configured to output a value indicating the synthetic image based on the first coordinate map estimated from the synthetic image and output a value indicating the real image based on the second coordinate map estimated from the real image.

In another general aspect, a method with global localization includes: determining one or more ground truth losses based on one or more features extracted by one or more networks based on a synthetic image and ground truth data corresponding to the synthetic image; determining one or more generative adversarial network (GAN) losses based on the one or more features extracted by the one or more networks based on the synthetic image and one or more features extracted by the one or more networks based on a real image; and training any one or any combination of any two or more of the one or more networks based on any one or any combination of any two or more of the one or more ground truth losses and the one or more GAN losses.

The determining of the one or more GAN losses may include either one or both of: determining a first GAN loss based on a first feature extracted by a first network based on the synthetic image and a second feature extracted by the first network based on the real image; and determining a second GAN loss based on a first coordinate map estimated by a second network based on the first feature and a second coordinate map estimated by the second network based on the second feature.

The determining of the one or more ground truth losses may include either one or both of: determining a first loss based on a first coordinate map estimated by a second network of the one or more networks based on a first feature and the ground truth data, wherein the first feature is extracted by a first network based on the synthetic image; and determining a second loss based on a first pose estimated based on the first coordinate map and the ground truth data.

Other features and aspects will be apparent from the following detailed description, the drawings, and the claims.

Figure 1:
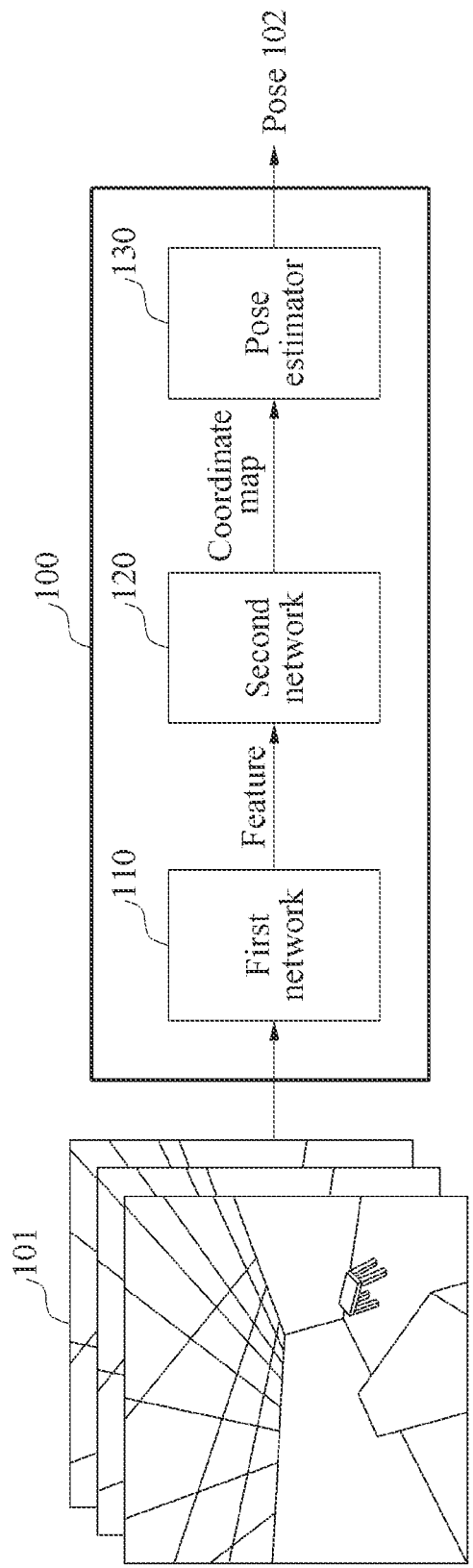
FIG. 1 illustrates an example of a framework of a global localization model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains, consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of a framework of a global localization model 100.

Referring to FIG. 1, the global localization model 100 (or a global localization device) may correspond to a model that performs a global localization method of receiving an image 101 (e.g., one or more images) and outputting a pose 102 corresponding to a global localization result. The global localization model 100 may include a first network 110, a second network 120, and a pose estimator 130. The first network 110 and the second network 120 may be trained neural networks. Hereinafter, the global localization model 100 may be briefly referred to as a "model".

The image 101 may be an image obtained (e.g., determined) by projecting an object located in a three-dimensional (3D) space onto a two-dimensional (2D) plane, and a shape of the projected object in the image may vary according to a position and an angle at which the object is captured.

Figure 2:
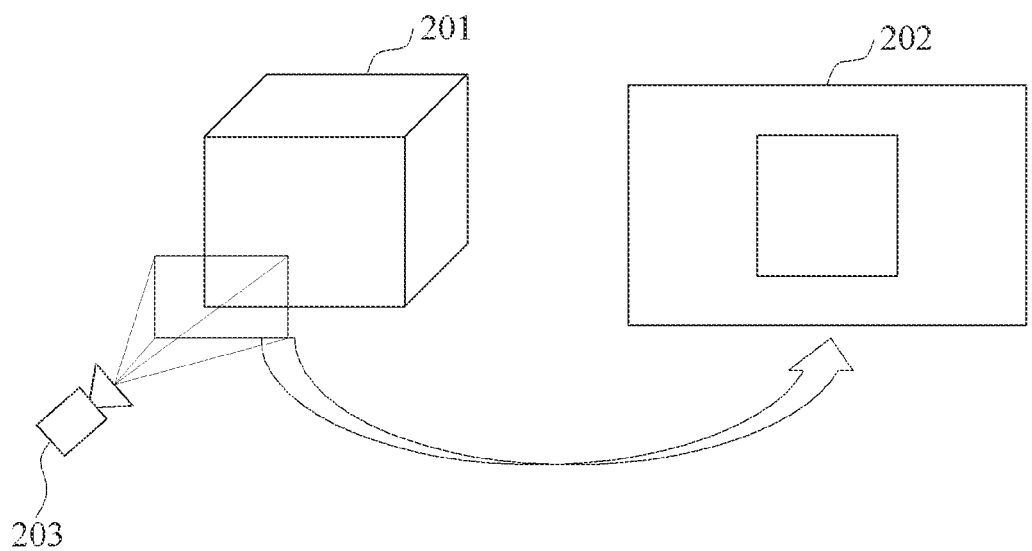
FIG. 2 illustrates an example of an image that is input data of a global localization model.

For example, referring to FIG. 2, an image 202 projected onto a 2D plane may be obtained by capturing an object 201 located in a 3D space at a predetermined position and a predetermined angle. When a position and/or an angle at which the object 201 is captured are changed, a shape of the object 201 included in the image 202 may change. The shape of the object 201 in the image 202 may correspond to a shape obtained through projection transformation of an actual shape of the object 201 according to the position and angle at which the object 201 is captured, that is, according to a pose of a device 203 that captures or senses the object 201.

Referring back to FIG. 1, the model 100 may know 3D coordinates corresponding to the 3D space of the projected object on the input image 101. In this example, a position and an angle at which the object is captured (for example, a pose of a device that captures or senses the object) may be estimated. The model 100 may estimate 3D coordinates (hereinafter, a coordinate map) corresponding to each pixel of an image including projection of an object based on the trained first and second networks 110 and 120. The model 100 may estimate the pose 102 of the device that obtains the input image 101, based on a relationship between 2D coordinates of pixels in the image 101 and 3D coordinates corresponding to the pixels, based on the pose estimator 130.

The first network 110 and the second network 120 in the global localization model 100 may be, for example, neural networks each including at least one layer with parameters that are determined through training.

The global localization method based on the global localization model 100 may include an operation of extracting a feature by applying the input image 101 to the first network 110, an operation of estimating a coordinate map corresponding to the input image 101 by applying the extracted feature to the second network 120, and an operation of estimating the pose 102 corresponding to the input image 101 by applying the estimated coordinate map to the pose estimator 130.

According to an example, the first network 110 may correspond to a neural network trained to extract a feature from an input image.

According to an example, the second network 120 may correspond to a neural network trained to estimate the coordinate map corresponding to the input image 101 based on the feature extracted by the first network 110. The coordinate map may correspond to 3D coordinates of a region in a 3D space corresponding to each pixel of an image.

Figure 3:
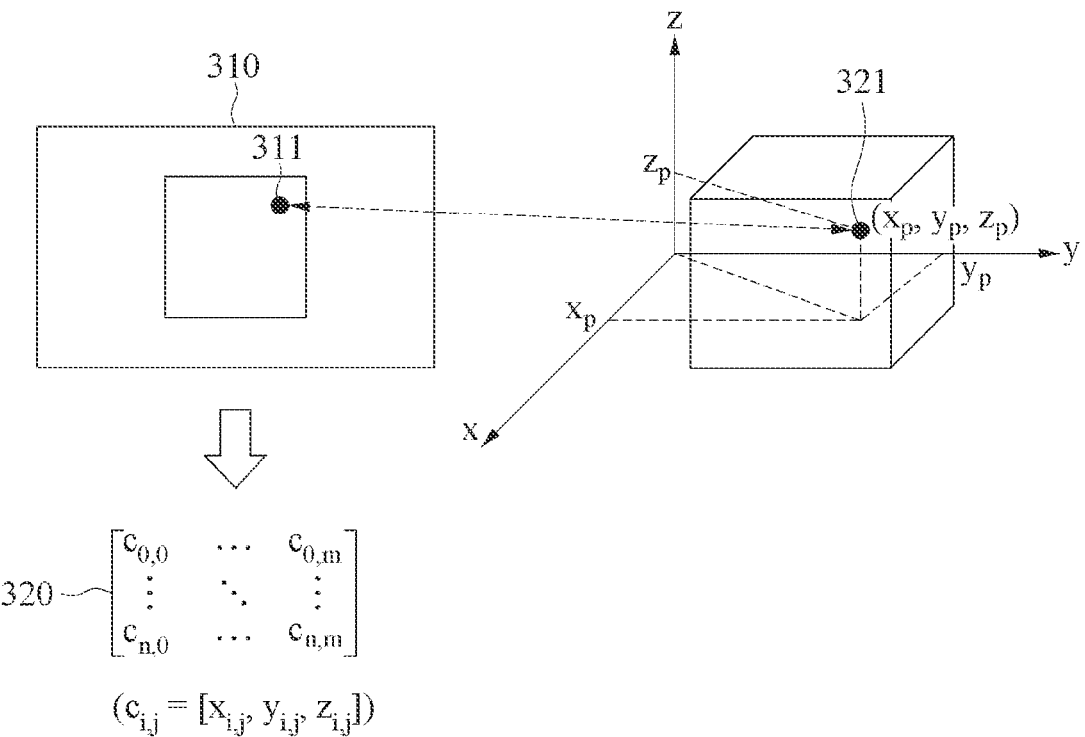
FIG. 3 illustrates an example of a coordinate map.

For example, referring to FIG. 3, a pixel 311 included in an image 310 may correspond to a point 321 in a 3D space, and the point 321 in the 3D space corresponding to the pixel 311 may be located at coordinates $(x_p, y_p, z_p)$. A coordinate map 320 may include a matrix of elements $c=\{c_{i,j}|i=0, 1, \ldots, n, j=0, 1, \ldots, m\}$ corresponding to pixels $p=\{p_{i,j}|i=0, 1, \ldots, n, j=0, 1, \ldots, m\}$ included in the image 310, and a value of an element $c_{i,j}$ corresponding to each pixel $p_{i,j}$ may correspond to 3D coordinates $c_{i,j}=[x_{i,j}, y_{i,j}, z_{i,j}]$.

Referring back to FIG. 1, the pose estimator 130 may estimate the pose 102 corresponding to the input image 101, based on the coordinate map estimated at the second network 120. For example, the pose estimator 130 may include a solvePnP (or perspective-n-point) function that outputs the pose 102 by receiving the coordinate map. The pose 102 output from the pose estimator 130 may include position information and direction information of the device that captures or senses the input image 101. The device may include, for example, a camera, a device including a camera, and/or a device including an image sensor.

The pose 102 may include a six-degrees-of-freedom (6DoF) pose. The 6DoF pose may include 3D position information about three axes orthogonal to each other in vertical, horizontal, and depth directions, and direction information about a degree of inclination with respect to the three axes.

Figure 4:
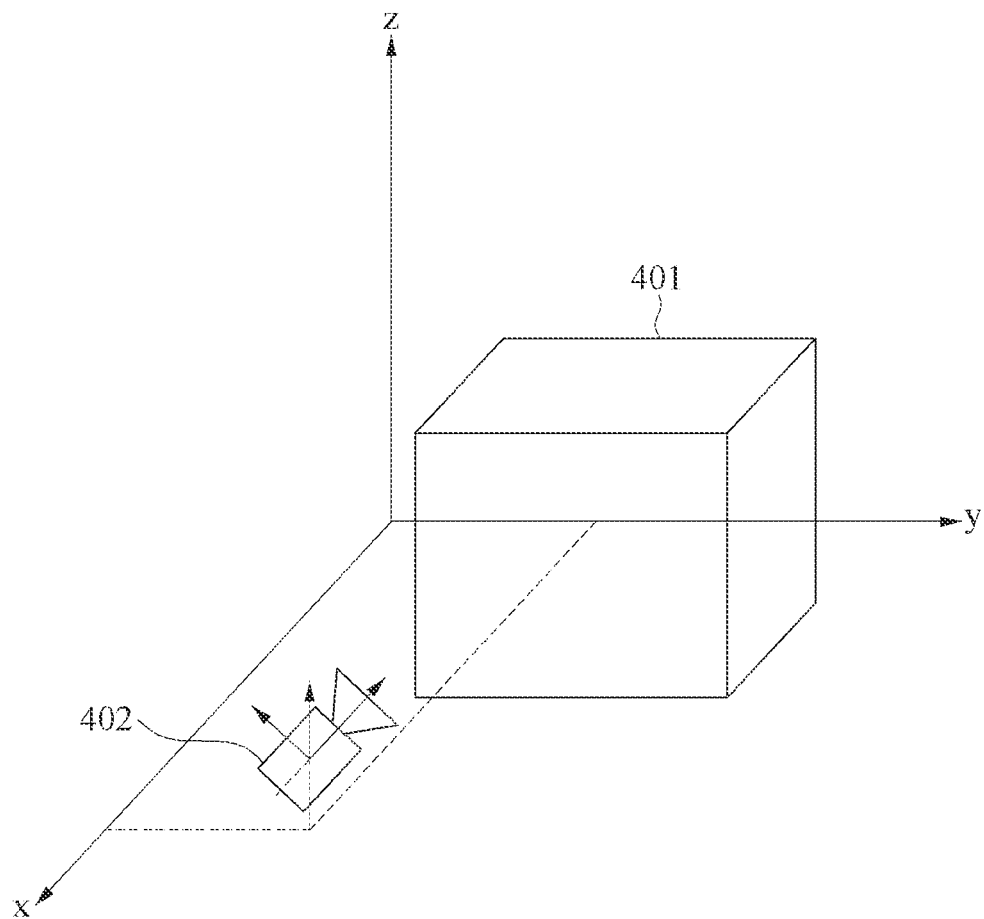
FIG. 4 illustrates an example of a pose corresponding to a global localization result according to a global localization model.

For example, referring to FIG. 4, a global localization model may estimate a 6DoF pose including position information and direction information of a device 402 (e.g., a camera) that captures an image including projection of an object 401 in a space in which the object 401 is located, based on a relationship between 2D coordinates of a pixel in the image and 3D coordinates corresponding to the pixel.

According to an example, the global localization model 100 may include the first network 110 and the second network 120 that are trained neural networks, and the first network 110 and the second network 120 may include parameters determined by a training process according to a backpropagation algorithm.

In other words, the global localization model 100 may be generated by a training process of a global localization model. The training process may include an operation of obtaining a synthetic image captured by a virtual camera corresponding to an arbitrary pose and 3D coordinate data corresponding to each pixel of the synthetic image, based on 3D map data, an operation of iteratively back-propagating a gradient obtained based on at least one loss associated with a global localization model, to update parameters of the first network 110 and the second network 120 that are neural networks included in the global localization model, and an operation of storing the parameters of the first network 110 and the second network 120.

In an example, the first network 110 and/or the second network 120 may be trained to output ground truth data corresponding to an image included in training data. The image included in the training data may include an accurate coordinate map corresponding to the image and a synthetic image labeled with an accurate pose corresponding to the image. The synthetic image may be an image generated by assuming an image captured by a virtual camera based on 3D map data, and may be distinguished from a real image captured by a real camera in a real space. A non-limiting example of the training data including the synthetic image will be described below.

According to an example, at least one of the first network 110 and the second network 120 may be trained based on at least one of a first loss and a second loss. The first loss may be obtained based on ground truth data corresponding to a synthetic image included in training data and a coordinate map estimated by the second network 120 based on the synthetic image included in the training data, and the second loss may be obtained based on a pose estimated by the pose estimator 130 based on the synthetic image and the ground truth data corresponding to the synthetic image included in the training data. The ground truth data corresponding to the synthetic image included in the training data may include a ground truth (GT) of a coordinate map corresponding to the synthetic image, and a GT of a pose corresponding to the synthetic image. A non-limiting example of a method of training the global localization model based on the first loss and/or the second loss will be described in detail below.

In another example, the first network 110 and/or the second network 120 may be trained adversarially to a discriminator, which is configured to discriminate between a real image and a synthetic image, based on a generative adversarial network (GAN) loss according to the discriminator. For example, at least one of the first network 110 and the second network 120 may be trained based on at least one of a first GAN loss and a second GAN loss. The first GAN loss may correspond to a loss obtained based on a first feature extracted by the first network 110 based on a synthetic image obtained by 3D map data, and a second feature extracted by the first network 110 based on a real image. The second GAN loss may correspond to a loss obtained based on a first coordinate map estimated by the second neural network 120 based on the first feature, and a second coordinate map estimated by the second neural network 120 based on the second feature. An example of a method of training the global localization model based on the first GAN loss and/or the second GAN loss will be described in detail below.

Figure 5:
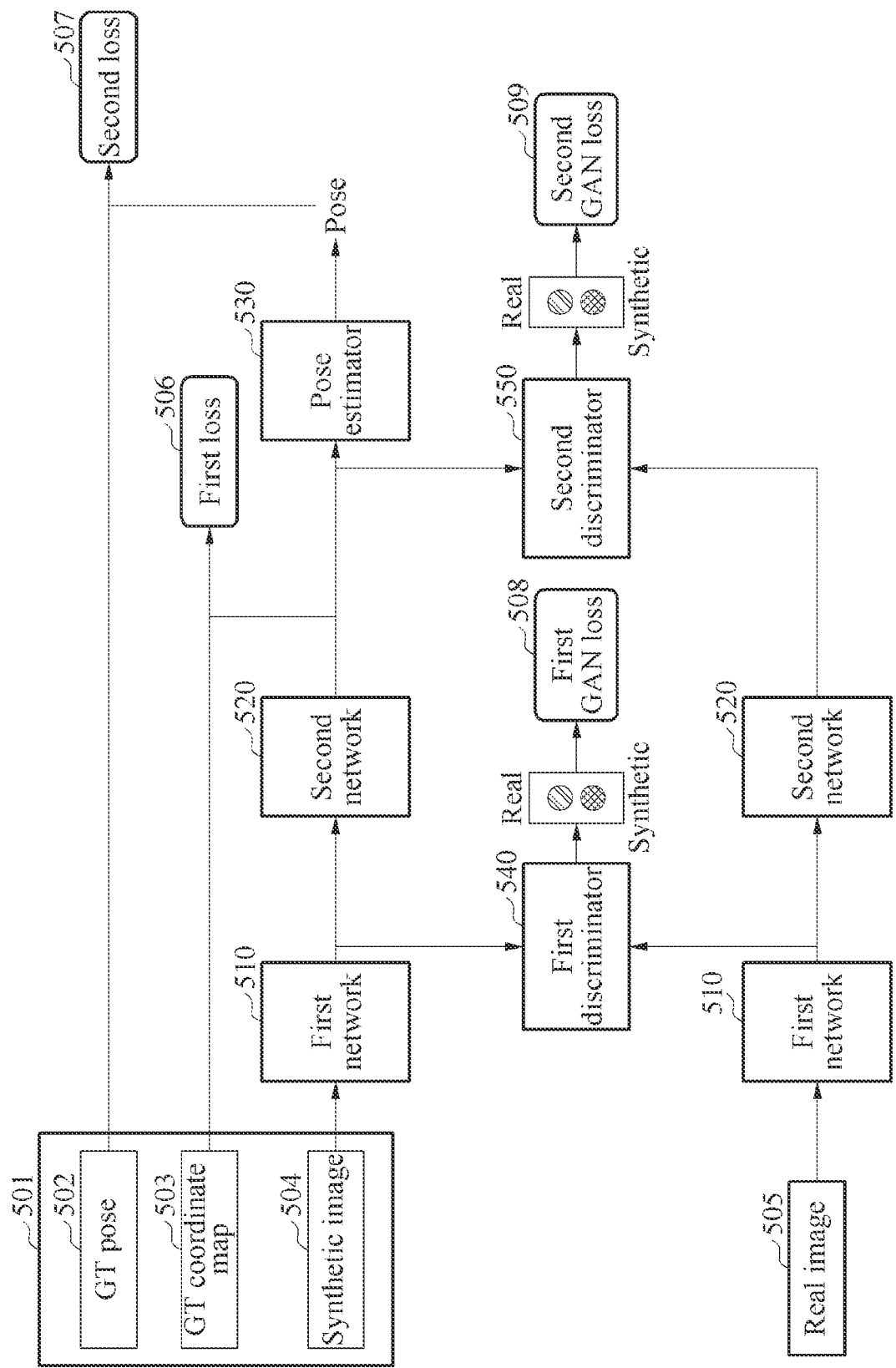
FIG. 5 illustrates an example of a framework of a method of training a global localization model.

FIG. 5 illustrates an example of a framework of a method of training a global localization model.

Referring to FIG. 5, training data of the global localization model may include a synthetic data set 501 and a real image 505. The synthetic data set 501 may include a synthetic image 504 captured by a virtual camera corresponding to an arbitrary pose, and 3D coordinate data corresponding to each pixel of the synthetic image 504. The 3D coordinate data corresponding to each pixel of the synthetic image 504 may correspond to ground truth data 503 (hereinafter, referred to as a "GT coordinate map 503") of a coordinate map corresponding to the synthetic image 504. According to an example, the synthetic image 504 included in the synthetic data set 501 may include pose information of the virtual camera that captures the synthetic image 504. In other words, the synthetic data set 501 may further include ground truth data 502 (hereinafter, referred to as a "GT pose 502") of a pose corresponding to the synthetic image 504. In other words, the synthetic image 504 included in the synthetic data set 501 may be labeled with the GT pose 502 and the GT coordinate map 503.

Figure 6A:
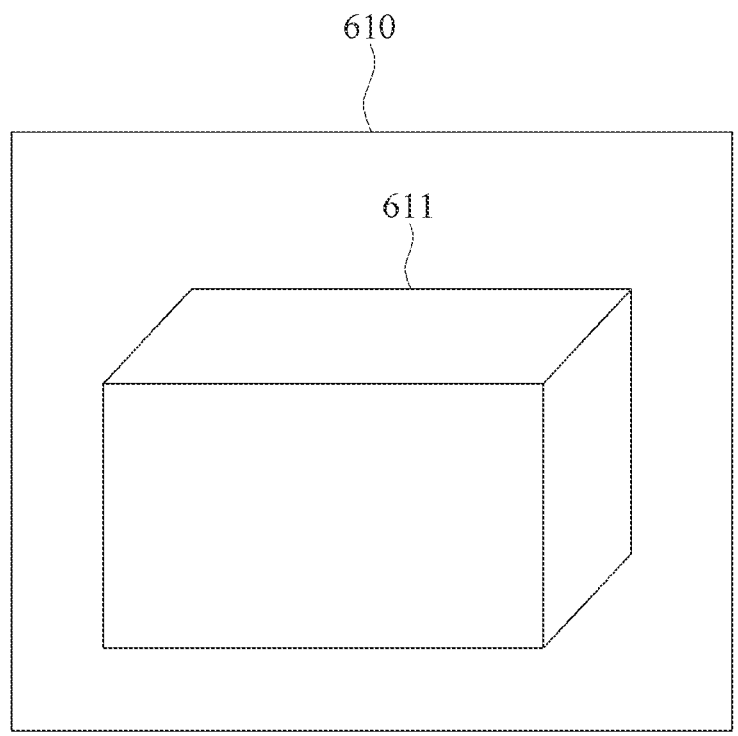
FIGS. 6A and 6B illustrate examples of three-dimensional (3D) map data.
Figure 6B:
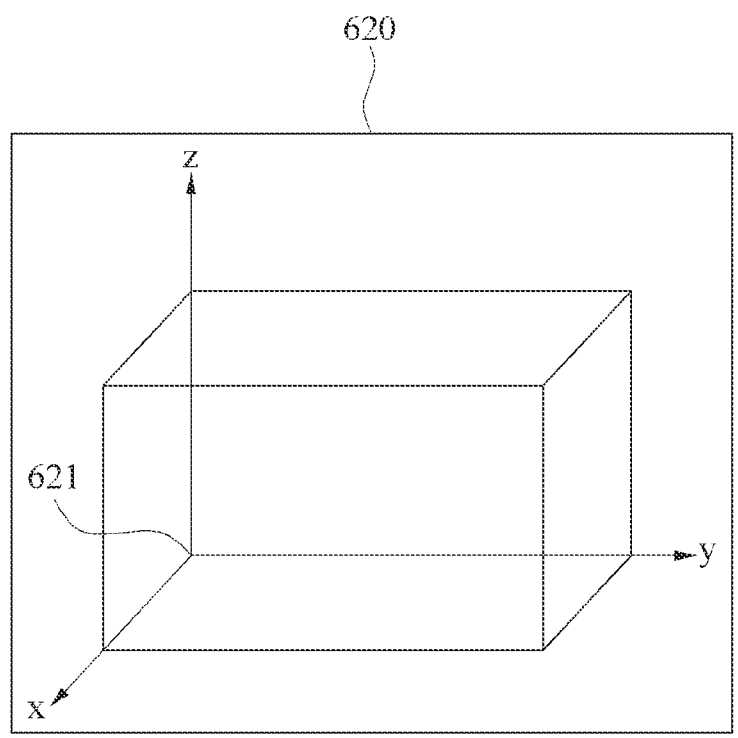

According to an example, the synthetic data set 501 may be obtained based on 3D map data. For example, referring to FIG. 6A, 3D map data 610 may include a point cloud 611 corresponding to an arbitrary space. In other words, the 3D map data 610 may correspond to data obtained by modeling at least one object included in the arbitrary space as the point cloud 611 that is a set of points in a 3D virtual space. For example, referring to FIG. 6B, points included in a point cloud may be represented in a 3D coordinate system 620 having a predetermined position 621 as an origin in a 3D virtual space, and 3D coordinates corresponding to each point may be construed to indicate a position of a corresponding point in a 3D space. The points included in the point cloud may include 3D coordinates indicating a position and RGB values indicating a color.

Referring back to FIG. 5, the synthetic image 504 captured by the virtual camera corresponding to the arbitrary pose may be obtained based on 3D map data. The synthetic image 504 may correspond to a composite projection image of an object obtained assuming that an object included in the 3D map data is captured by a virtual camera disposed at a predetermined angle and a predetermined position in a space corresponding to the 3D map data. In other words, the synthetic image 504 may be an image generated through projection transformation of some points included in the 3D map data, and may be distinguished from the real image 505 obtained by capturing a real space with a real camera. The projection transformation may be determined based on a position and an angle of the virtual camera. According to an example, the synthetic image 504 may further include color information based on RGB values of points projected on the synthetic image 504.

3D coordinates in the 3D map data of a region corresponding to each pixel in the synthetic image 504 may be accurately identified, and accordingly the GT coordinate map 503 corresponding to the synthetic image 504 may be obtained. In addition, since the synthetic image 504 corresponds to an image generated based on 3D map data by assuming an arrangement of a virtual camera, a pose of a virtual device that captures the synthetic image 504 may be accurately known. Thus, the GT pose 502 corresponding to the synthetic image 504 may also be obtained.

According to an example, when the synthetic data set 501 includes the synthetic image 504, and the GT pose 502 and the GT coordinate map 503 that correspond to the synthetic image 504, a first loss 506 associated with a coordinate map estimated by the second network 520 and a second loss 507 associated with a pose estimated by a pose estimator 530 may be calculated in a training process.

According to an example, the first loss 506 may be obtained based on a first coordinate map output from the second network 520 based on the synthetic image 504 and the GT coordinate map 503 corresponding to the synthetic image 504. The first coordinate map may be output as a result obtained by applying a first feature output from the first network 510 based on the synthetic image 504 to the second network 520. In an example, a gradient obtained based on the first loss 506 may be iteratively back-propagated to the first network 510 and the second network 520, so that weights of the first network 510 and the second network 520 may be updated. The gradient obtained based on the first loss 506 may correspond to a gradient obtained by a difference between the first coordinate map output from the second network based on the synthetic image 504 and the GT coordinate map 503 corresponding to the synthetic image 504.

According to an example, the second loss 507 may be obtained based on a first pose output from the pose estimator 530 based on the synthetic image 504 and the GT pose 502 corresponding to the synthetic image 504. The first pose may be output as a result obtained by inputting the first coordinate map output from the second network 520 based on the synthetic image 504 to the pose estimator 530. For example, a gradient obtained based on the second loss 507 may be iteratively back-propagated to the first network 510 and the second network 520, so that the weights of the first network 510 and the second network 520 may be updated. The gradient obtained based on the second loss 507 may correspond to a gradient obtained by a difference between the first pose output from the pose estimator 530 based on the synthetic image 504 and the GT pose 502 corresponding to the synthetic image 504.

For example, when a weight of the second network 520 is denoted by $w_s$, $w_s$ may be trained through two processes, e.g., a process of minimizing a difference from a GT coordinate map and a process of minimizing a difference from a GT pose. Equations for the two processes may be defined as shown in Equations 1 and 2 below, respectively, for example.

$$w_S = \underset{w}{\operatorname{argmin}}\ L_S(S(f;w), s^*),\ L_S(s,s^*) = \sum_i \|s_i - s_{i^*}\| \quad \text{Equation 1}$$

$$w_S = \underset{w}{\operatorname{argmin}}\ L_P(P(S(f;w)),p^*), \quad \text{Equation 2}$$

$$L_P(p,p^*) = \max(\angle(\theta,\theta^*),\ \|t - t^*\|)$$

In Equation 1, f denotes an output of the first network 510, S denotes the second network 520, s=S(f,w) may correspond to a coordinate map output from f by a weight w of the second network 520, s* denotes a GT coordinate map, and $L_s$ denotes the first loss 506. The first loss 506 $L_s$ may be an error between the GT coordinate map s* and the coordinate map s estimated by the second network 520 and may be defined as a sum of s, estimated for a pixel i included in the synthetic image 504 and a norm of $s_i^*$ that is ground truth data.

In Equation 2, P denotes a pose estimator, p=P(S(f,w)) may correspond to a pose output from the pose estimator 530 based on the coordinate map s=S(f,w) output from the second network 520, and $L_p$ denotes the second loss 507. The second loss 507 $L_p$ may be an error between the pose p estimated by the pose estimator 530 and a GT pose p*, and may be determined as a maximum value of a rotation error $\angle(\theta,\ \theta^*)$ and a translation error $\|t-t^*\|$.

According to an example, when training of the global localization model is performed based on the synthetic data set 501 only, performance of global localization may be reduced with respect to the real image 505 corresponding to a domain different from that of the synthetic image 504. To reduce a domain gap between the synthetic image 504 and the real image 505 in the global localization model, the training process of one or more embodiments may additionally be performed using a first discriminator 540 and a second discriminator 550.

According to an example, the first discriminator 540 may perform domain classification of features output from the first network 510, and the second discriminator 550 may perform domain classification of coordinate maps output from the second network 520. The domain classification may correspond to an operation of determining whether input data corresponds to the synthetic image 504 or the real image 505.

For example, the first discriminator 540 may include a neural network configured to output a value indicating the synthetic image 504 based on a feature extracted from the synthetic image 504, and to output a value indicating the real image 505 based on a feature extracted from the real image 505. The first discriminator 540 may be trained to output a value (e.g., a value of "1") indicating the synthetic image 504 when an input feature is determined to be a feature extracted from the synthetic image 504, and to output a value (e.g., a value of "0") indicating the real image 505 when the input feature is determined to be a feature extracted from the real image 505.

In addition, the second discriminator 550 may include a neural network configured to output a value indicating the synthetic image 504 based on a coordinate map estimated from the synthetic image 504, and to output a value indicating the real image 505 based on a coordinate map estimated from the real image 505. The second discriminator 550 may be trained to output a value (e.g., a value of "1") indicating the synthetic image 504 when an input coordinate map is determined to be a coordinate map estimated based on the synthetic image 504, and to output a value (e.g., a value of "0") indicating the real image 505 when the input coordinate map is determined to be a coordinate map estimated based on the real image 505.

According to an example, the first network 510 may be trained adversarially to the first discriminator 540, based on a first GAN loss 508. The first GAN loss 508 may be obtained based on a first feature extracted by the first network 510 based on the synthetic image 504 and a second feature extracted by the first network 510 based on the real image 505. For example, when the synthetic image 504 is input to the global localization model, the first GAN loss 508 may be calculated based on a difference between a result output from the first discriminator 540 based on the first feature and a value indicating the synthetic image 504 which is ground truth data of domain classification corresponding to the first feature. When the real image 505 is input to the global localization model, the first GAN loss 508 may be calculated based on a difference between a result output from the first discriminator 540 based on the second feature and a value indicating the real image 505 which is ground truth data of domain classification corresponding to the second feature.

For example, a gradient obtained based on the first GAN loss 508 may be iteratively back-propagated to the first discriminator 540 and the first network 510, so that weights of the first discriminator 540 and the first network 510 may be updated. The gradient obtained based on the first GAN loss 508 may correspond to a gradient obtained by a difference between a domain classification result output based on an input feature from the first discriminator 540 and ground truth data of domain classification corresponding to the input feature. For example, based on the first GAN loss 508, the first discriminator 540 may be trained to output the ground truth data of the domain classification based on the input feature, and the first network 510 may be trained to extract features on which it is difficult for the first discriminator 540 to perform domain classification (e.g., the first network 510 may be trained to extract features such that an accuracy of domain classification performed by the first discriminator 540 based on the extracted features is below a predetermined threshold).

According to an example, in the training process, the synthetic image 504 and the real image 505 may be alternately input to the global localization model. In an example, a process of back-propagating a gradient obtained by inputting the first feature to the first discriminator 540 based on the first GAN loss 508 in response to an input of the synthetic image 504, and a process of back-propagating a gradient obtained by inputting the second feature to the first discriminator 540 based on the first GAN loss 508 in response to an input of the real image 505 may be alternately performed. In another example, a process of back-propagating a gradient obtained by inputting the first coordinate map to the second discriminator 550 based on the second GAN loss 509 in response to an input of the synthetic image 504, and a process of back-propagating a gradient obtained by inputting the second coordinate map to the second discriminator 550 based on the second GAN loss 509 in response to an input of the real image 505 may be alternately performed.

According to an example, the second network 520 may be trained adversarially to the second discriminator 550, based on the second GAN loss 509. The second GAN loss 509 may be obtained based on the first coordinate map estimated by the second network 520 based on the first feature, and the second coordinate map estimated by the second network 520 based on the second feature. As described above, the first feature may correspond to a feature output from the first network 510 based on the synthetic image 504, and the second feature may correspond to a feature output from the first network 510 based on the real image 505. For example, when the synthetic image 504 is input to the global localization model, the second GAN loss 509 may be calculated based on a difference between a result output from the second discriminator 550 based on the first coordinate map and a value indicating the synthetic image 504 which is ground truth data of domain classification corresponding to the first coordinate map. When the real image 505 is input to the global localization model, the second GAN loss 509 may be calculated based on a difference between a result output from the second discriminator 550 based on the second coordinate map and a value indicating the real image 505 which is ground truth data of domain classification corresponding to the second coordinate map.

In an example, a gradient obtained based on the second GAN loss 509 may be iteratively back-propagated to the second discriminator 550 and the second network 520, so that weights of the second discriminator 550 and the second network 520 may be updated. The gradient obtained based on the second GAN loss 509 may correspond to a gradient obtained by a difference between a domain classification result output based on an input coordinate map from the second discriminator 550 and ground truth data of domain classification corresponding to the input coordinate map. For example, based on the second GAN loss 509, the second discriminator 550 may be trained to output the ground truth data of the domain classification based on the input coordinate map, and the second network 520 may be trained to extract coordinate maps on which it is difficult for the second discriminator 550 to perform domain classification (e.g., the second network 520 may be trained to extract coordinate maps such that an accuracy of domain classification performed by the second discriminator 550 based on the extracted coordinate maps is below a predetermined threshold).

According to an example, a gradient of the second GAN loss 509 may also be back-propagated to the first network 510 in addition to the second discriminator 550 and the second network 520, and accordingly the weight of the first network 510 may be updated.

According to an example, a process of back-propagating the gradient obtained based on the first GAN loss 508 may include a process of back-propagating a gradient of an error corresponding to an output obtained by inputting the first feature to the first discriminator 540 to the first discriminator 540 and the first network 510 based on the first GAN loss 508, and a process of iteratively back-propagating a gradient of an error corresponding to an output obtained by inputting the second feature to the first discriminator 540 to the first discriminator 540 and the first network 510 based on the first GAN loss 508. For example, the gradient of the error corresponding to the output obtained by inputting the first feature to the first discriminator 540, and the gradient of the error corresponding to the output obtained by inputting the second feature to the first discriminator 540 may be alternately back-propagated.

According to an example, an operation of training at least one of the first network 510 and the second network 520 may include training the second network 520 and the second discriminator 550 based on the second GAN loss 509. The second discriminator 550 may be configured to discriminate between a coordinate map estimated from the synthetic image 504 and a coordinate map estimated from the real image 505. The second GAN loss 509 may include a loss that is obtained based on the first coordinate map estimated by the second network 520 based on the first feature and the second coordinate map estimated by the second network 520 based on the second feature. For example, the synthetic image 504 and the real image 505 may be alternately input to the global localization model, and a gradient of an error obtained based on the second GAN loss 509 may be iteratively back-propagated to the second discriminator 550 and the second network 520.

According to an example, a process of back-propagating the gradient of the error obtained based on the second GAN loss 509 may include a process of back-propagating a gradient of an error corresponding to an output obtained by inputting the first feature to the second discriminator 550 to the second discriminator 550 and the second network 520 based on the second GAN loss 509, and a process of iteratively back-propagating a gradient of an error corresponding to an output obtained by inputting the second feature to the second discriminator 550 to the second discriminator 550 and the second network 520 based on the second GAN loss 509. For example, the synthetic image 504 and the real image 505 may be alternately input to the global localization model, and the gradient of the error corresponding to the output obtained by inputting the first feature to the second discriminator 550, and the gradient of the error corresponding to the output obtained by inputting the second feature to the second discriminator 550 may be alternately back-propagated.

For example, when a weight of the first discriminator 540 and a weight of the second discriminator 550 are denoted by $w_{D1}$ and $w_{D2}$, respectively, $w_{D1}$ and $w_{D2}$ may be trained through processes of minimizing a difference from ground truth data of domain classification. Equations for the above processes may be defined as shown in Equations 3 and 4 below, for example.

$$w_{D_1} = \underset{w}{\operatorname{argmin}}\, L_{D_1}(D_1(f;w),d^*) \quad \text{Equation 3}$$

$$w_{D_2} = \underset{w}{\operatorname{argmin}}\, L_{D_2}(D_2(s;w),d^*) \quad \text{Equation 4}$$

In Equations 3 and 4, $d^* \in \{0,1\}$ denotes ground truth data of domain classification and may use a binary variable indicating the synthetic image 504 or the real image 505, $D_1$ denotes the first discriminator 540, $D_1(f,w)$ denotes a domain classification result output from the first discriminator 540 based on an input feature f, $L_{D_1}$ denotes the first GAN loss 508, $D_2$ denotes the second discriminator 550, $D_2(s; w)$ denotes a domain classification result output from the second discriminator 550 based on an input coordinate map s, and $L_{D_2}$ denotes the second GAN loss 509. The first GAN loss 508 $L_{D_1}$ and the second GAN loss 509 $L_{D_2}$ may use binary cross entropy.

As described above, the first network 510 may be trained adversarially to the first discriminator 540 based on the first GAN loss 508, and may be trained based on the first loss 506 and the second loss 507. In an example, a process of training the first network 510 may be defined as two operations, that is, a training operation to update the weight of the first network 510 based on the first GAN loss 508 and the first loss 506, and a training operation to update the weight of the first network 510 based on the first GAN loss 508 and the second loss 507, as shown in Equations 5 and 6 below, respectively, for example.

$$w_F = \underset{w}{\operatorname{argmin}}\, L_S(S(F(I;w);w_S),s^*) - \lambda L_{D_1}(D_1(F(I;w);W_{D_1}),d^*) \quad \text{Equation 5}$$

$$w_F = \underset{w}{\operatorname{argmin}}\, L_P(P(S(F(I;w);w_S)),p^*) - \lambda L_{D_1}(D_1(F(I;w);W_{D_1}),d^*) \quad \text{Equation 6}$$

As described above, the second network 520 may be trained adversarially to the second discriminator 550 based on the second GAN loss 509, and may be trained based on the first loss 506 and the second loss 507. In an example, a process of training the second network 520 may be defined as two processes, that is, a training process to update the weight of the second network 520 based on the second GAN loss 509 and the first loss 506, and a training process to update the weight of the second network 520 based on the second GAN loss 509 and the second loss 507, as shown in Equations 7 and 8 below, respectively, for example.

$$w_S = \underset{w}{\operatorname{argmin}}\, L_S(S(f;w),s^*) - \lambda L_{D_2}(D_2(S(f;w);W_{D_2}),d^*) \quad \text{Equation 7}$$

$$w_S = \underset{w}{\operatorname{argmin}}\, L_P(P(S(f;w)),p^*) - \lambda L_{D_2}(D_2(S(f;w);W_{D_2}),d^*) \quad \text{Equation 8}$$

As described above, the gradient of the second GAN loss 509 may also be back-propagated to the first network 510 in addition to the second discriminator 550 and the second network 520, and accordingly the first network 510 may be trained to update the weight of the first network 510 based on the second GAN loss 509.

Figure 7:
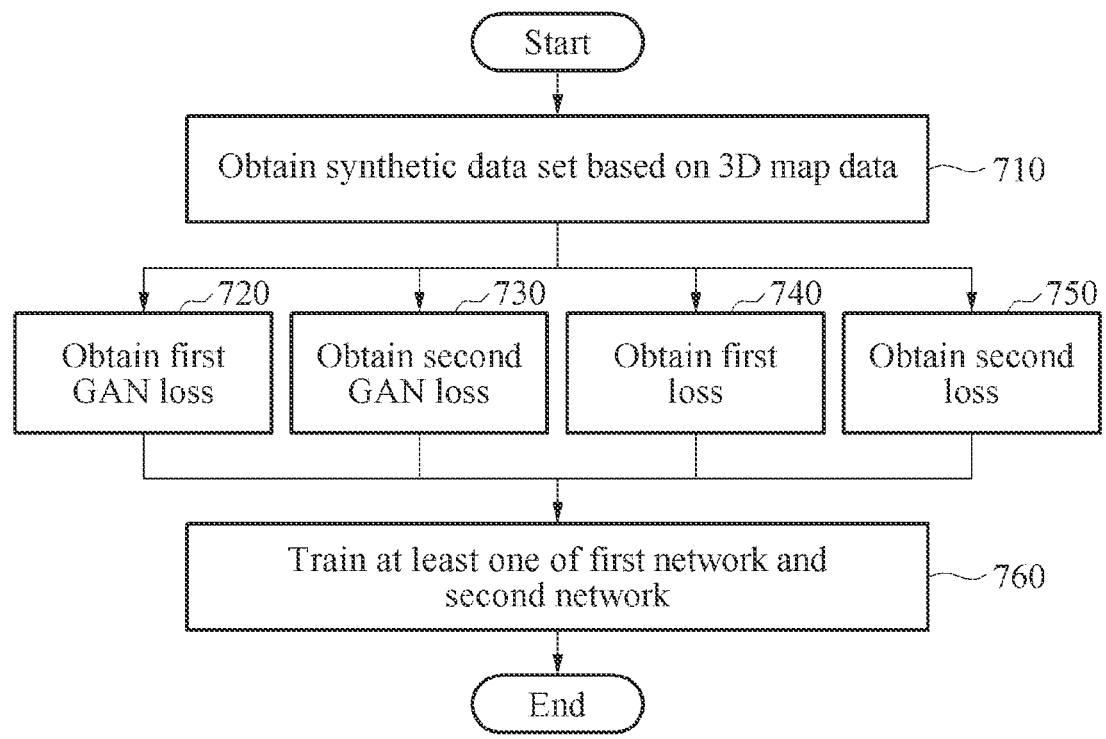
FIG. 7 is a flowchart illustrating an example of a method of training a global localization model.

FIG. 7 is a flowchart illustrating an example of a method of training a global localization model.

Referring to FIG. 7, the method of training the global localization model may include operation 710 of obtaining a synthetic data set based on 3D map data, operation 720 of obtaining a first GAN loss, operation 730 of obtaining a second GAN loss, operation 740 of obtaining a first loss, operation 750 of obtaining a second loss, and operation 760 of training at least one of a first network and a second network. Operations 710 to 760 of the method of training the global localization model may be performed by at least one processor.

Operation 710 may include obtaining a synthetic data set including a synthetic image captured by a virtual camera corresponding to an arbitrary pose and 3D coordinate data corresponding to each pixel of the synthetic image. As described above, the 3D coordinate data corresponding to each pixel of the synthetic image may correspond to a GT coordinate map, and the synthetic data set may further include a GT pose corresponding to the synthetic image.

The method of training the global localization model may further include, after operation 710, an operation of extracting a first feature by applying the synthetic image to the first network, an operation of estimating a first coordinate map corresponding to each pixel of the synthetic image by applying the extracted first feature to the second network, and an operation of estimating a first pose corresponding to the synthetic image based on the estimated first coordinate map. In addition, the method may further include an operation of extracting a second feature by applying a real image captured by a real camera to the first network, and an operation of estimating a second coordinate map corresponding to each pixel of the real image by applying the extracted second feature to the second network.

Operation 720 may include an operation of obtaining the first GAN loss based on the first feature obtained by applying the synthetic image to the first network and the second feature obtained by applying the real image to the first network.

Operation 730 may include obtaining the second GAN loss based on the first coordinate map obtained by applying the first feature to the second network and the second coordinate map obtained by applying the second feature to the second network.

Operation 740 may include an operation of obtaining the first loss based on the first coordinate map and the 3D coordinate data corresponding to the synthetic image.

Operation 750 may include obtaining the second loss based on the first pose estimated based on the first coordinate map and a pose of the virtual camera.

Operation 760 may include training at least one of (e.g., either one or both of) the first network and the second network based on any one or any combination of the first loss, the second loss, the first GAN loss, and the second GAN loss. For example, operation 760 may include an operation of iteratively back-propagating a gradient obtained based on at least one loss (e.g., at least one of the first loss, the second loss, the first GAN loss, and the second GAN loss) associated with the global localization model, to update parameters of a neural network (e.g., at least one of the first network and the second network) included in the global localization model, and an operation of storing the parameters of the neural network. The parameters of the neural network may be stored in a recording medium or a memory in which the global localization model is stored.

According to an example, operation 760 may include an operation of training the first network and a first discriminator, which is configured to discriminate between a feature extracted from the synthetic image and a feature extracted from the real image, based on the first GAN loss. For example, operation 760 may include an operation of iteratively back-propagating a gradient obtained by inputting the first feature to the first discriminator to the first discriminator and the first network, based on the first GAN loss, and an operation of iteratively back-propagating a gradient obtained by inputting the second feature to the first discriminator to the first discriminator and the first network, based on the first GAN loss. As described above, the first discriminator may include a neural network configured to output a value indicating the synthetic image based on the feature extracted from the synthetic image, and to output a value indicating the real image based on the feature extracted from the real image.

According to an example, operation 760 may include an operation of training the second network and a second discriminator, which is configured to discriminate between a coordinate map estimated from the synthetic image and a coordinate map estimated from the real image, based on the second GAN loss. For example, operation 760 may include an operation of iteratively back-propagating a gradient obtained by inputting the first coordinate map to the second discriminator to the second discriminator and the second network, based on the second GAN loss, and an operation of iteratively back-propagating a gradient obtained by inputting the second coordinate map to the second discriminator to the second discriminator and the second network, based on the second GAN loss. As described above, the second discriminator may include a neural network configured to output a value indicating the synthetic image based on the coordinate map estimated from the synthetic image, and to output a value indicating the real image based on the coordinate map estimated from the real image.

In an example, operation 760 may include iteratively back-propagating a gradient obtained based on the first loss to the first network and the second network. In another example, operation 760 may include iteratively back-propagating a gradient obtained based on the second loss to the first network and the second network.

Figure 8:
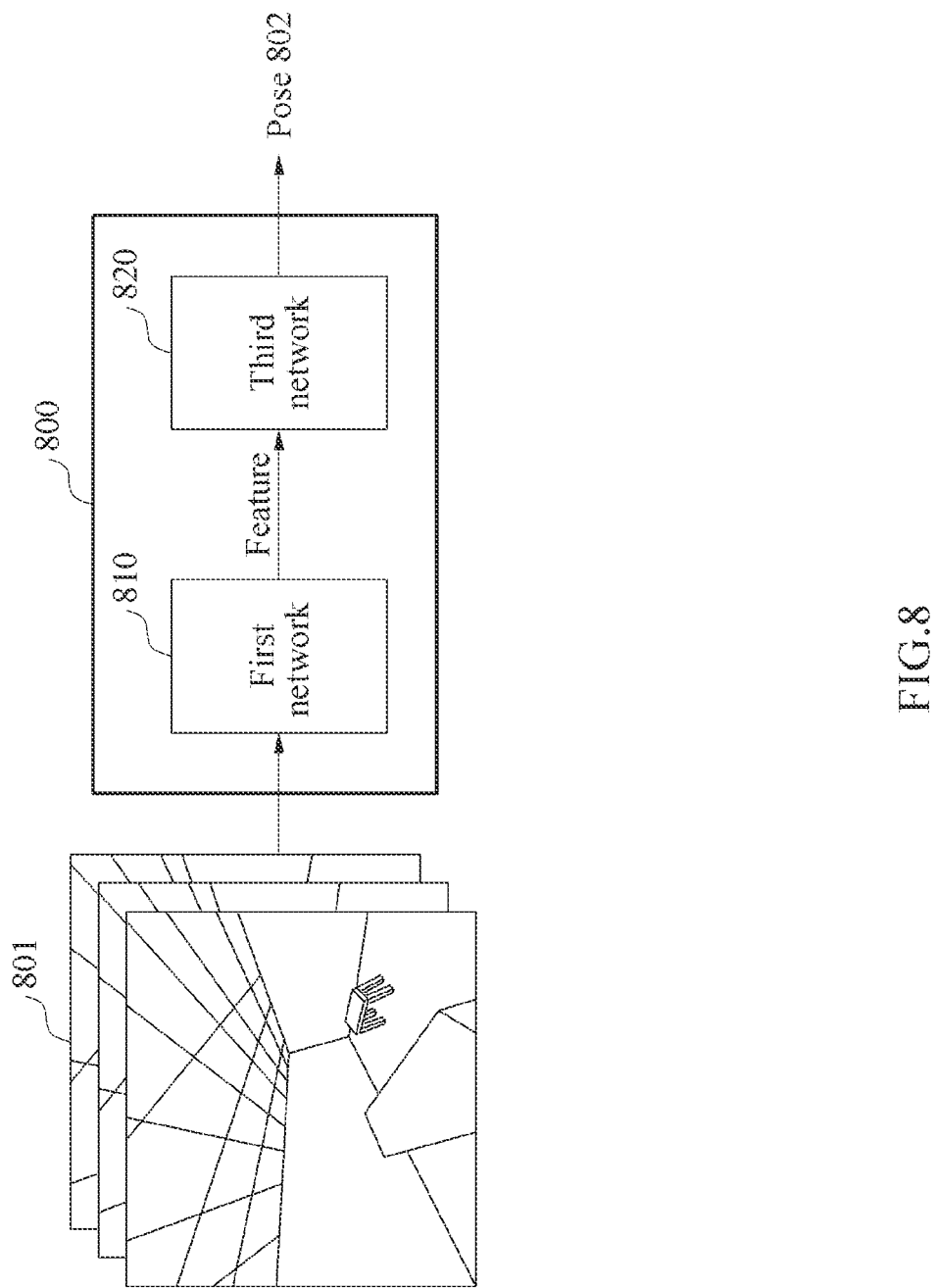
FIG. 8 illustrates an example of a framework of a global localization model.

FIG. 8 illustrates an example of a framework of a global localization model 800.

Referring to FIG. 8, the global localization model 800 may correspond to a model configured to perform a global localization method of receiving an image 801 and outputting a pose 802 corresponding to a global localization result. The global localization model 800 may include a trained neural network, and the neural network may include a first network 810 and a third network 820.

According to an example, the image 801 and the pose 802 that are input data and output data of the global localization model 800, respectively, may respectively correspond to the image 101 and the pose 102 that are input data and output data of the global localization model 100 of FIG. 1, respectively.

The first network 810 may be, for example, a network trained to extract a feature from an input image and may correspond to the neural network 110 of FIG. 1.

The third network 820 may correspond to, for example, a neural network trained to estimate a pose corresponding to the input image 801 based on a feature extracted by the first network 810. The pose estimator 130 of FIG. 1 may be a module to estimate the pose 102 corresponding to the input image 101 using, for example, a PnP algorithm, by receiving, as an input, a coordinate map that is an output of the second network 120, whereas the third network 820 may be a neural network to estimate the pose 802 corresponding to the input image 801 by receiving, as an input, a feature that is an output of the first network 810. Thus, the global localization model 800 may differ from the global localization model 100 of FIG. 1.

According to an example, the first network 810 and the third network 820 included in the global localization model 800 may include parameters determined by a training process based on a backpropagation algorithm. In other words, the global localization model 800 may be generated by a training process of a global localization model. The training process may include an operation of obtaining a synthetic image captured by a virtual camera corresponding to an arbitrary pose, based on 3D map data, an operation of iteratively back-propagating a gradient obtained based on at least one loss associated with the global localization model to update parameters of the first network 810 and the third network 820 included in the global localization model 800, and an operation of storing the parameters of the first network 810 and the third network 820.

In an example, the first network 810 and/or the third network 820 may be trained to output ground truth data corresponding to an image included in training data. For example, the first network 810 and the third network 820 may be trained based on a second loss obtained based on a pose estimated by the third network 820 based on a synthetic image included in the training data and ground truth data corresponding to the synthetic image included in the training data. The ground truth data corresponding to the synthetic image included in the training data may include a ground truth of a pose corresponding to the synthetic image. The second loss may correspond to the second loss described above with reference to FIGS. 1 to 7. An example of a method of training the global localization model based on the second loss will be described in detail below.

In another example, the first network 810 and the third network 820 may be trained adversarially to a discriminator, which is configured to discriminate between a real image and a synthetic image, based on a GAN loss according to the discriminator. For example, the first network 810 may be trained based on a first GAN loss. The first GAN loss may correspond to the first GAN loss described above with reference to FIGS. 1 to 7. In other words, the first GAN loss may correspond to a loss obtained based on a first feature extracted by the first network 810 based on a synthetic image obtained based on 3D map data, and a second feature extracted by the first network 810 based on a real image. An example of a method of training the global localization model based on the first GAN loss will be described in detail below.

Figure 9:
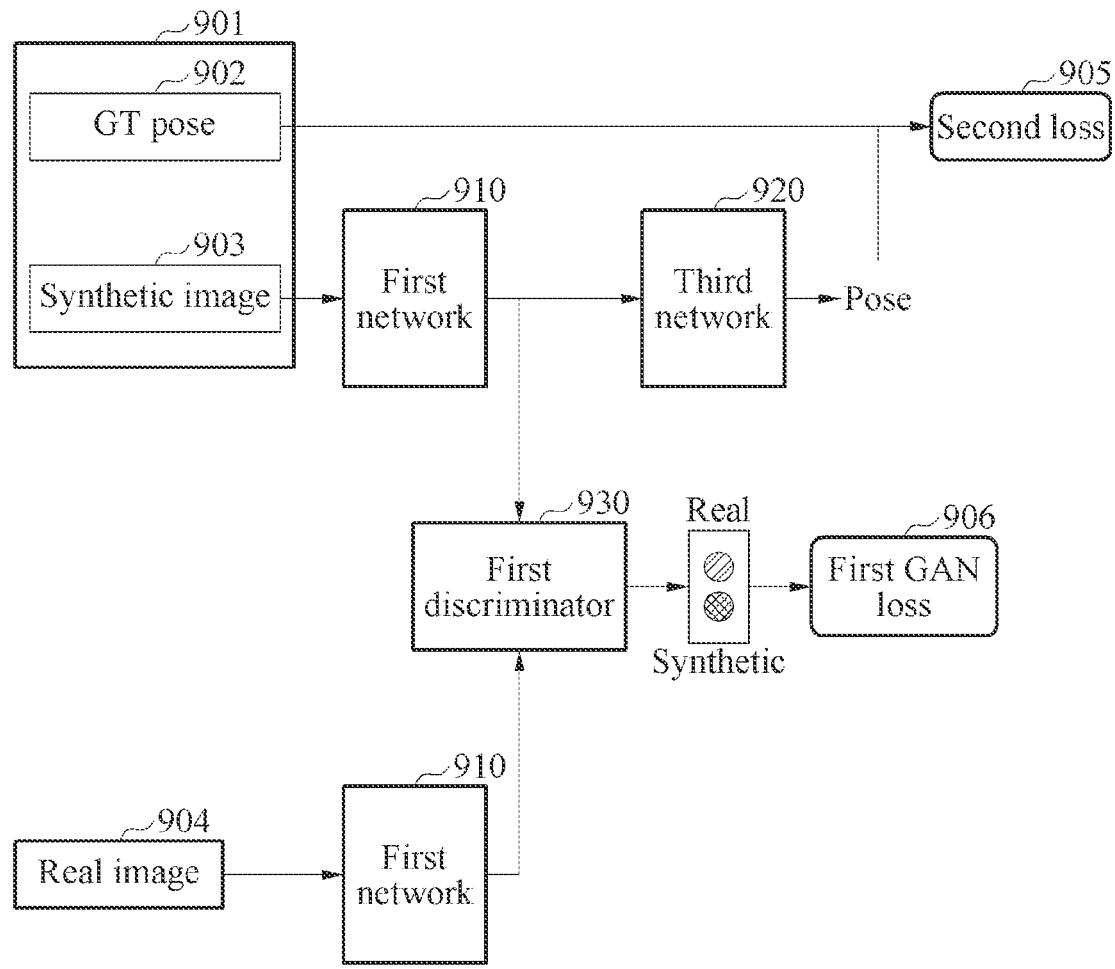
FIG. 9 illustrates an example of a framework of a method of training a global localization model.

FIG. 9 illustrates another example of a framework of a method of training a global localization model.

Referring to FIG. 9, training data of the global localization model may include a synthetic data set 901 and a real image 904. The synthetic data set 901 may include a synthetic image 903 captured by a virtual camera corresponding to an arbitrary pose, and ground truth data 902 (hereinafter, referred to as a "GT pose 902") of a pose corresponding to the synthetic image 903. As described above, the synthetic image 903 included in the synthetic data set 901 may include pose information of the virtual camera that captures the synthetic image 903. Accordingly, the synthetic image 903 may be labeled with the GT pose 902.

According to an example, a second loss 905 may correspond to the second loss 507 described above with reference to FIG. 5. In other words, the second loss 905 may be obtained based on a pose estimated based on the synthetic image 903 in a third network 920 and the GT pose 902 corresponding to the synthetic image 903. For example, a gradient obtained based on the second loss 905 may be iteratively back-propagated to a first network 910 and the third network 920, so that weights of the first network 910 and the third network 920 may be updated.

According to an example, the first network 910 may be trained adversarially to a first discriminator 930, based on a first GAN loss 906. The first discriminator 930 may correspond to the first discriminator 540 described above with reference to FIG. 5. In other words, the first discriminator 930 may be trained to output a value (e.g., a value of "1") indicating the synthetic image 903 if an input feature is determined to be a feature extracted from the synthetic image 903, and to output a value (e.g., a value of "0") indicating the real image 904 if the input feature is determined to be a feature extracted from the real image 904.

According to an example, the first GAN loss 906 may correspond to the first GAN loss 508 described above with reference to FIG. 5. A gradient obtained based on the first GAN loss 906 may be iteratively back-propagated to the first discriminator 930 and the first network 910, so that weights of the first discriminator 930 and the first network 910 may be updated. For example, based on the first GAN loss 906, the first discriminator 930 may be trained to output ground truth data of domain classification based on an input feature, and the first network 910 may be trained to extract features on which it is difficult for the first discriminator 930 to perform domain classification (e.g., the first network 910 may be trained to extract features such that an accuracy of domain classification performed by the first discriminator 930 based on the extracted features is below a predetermined threshold).

Figure 10:
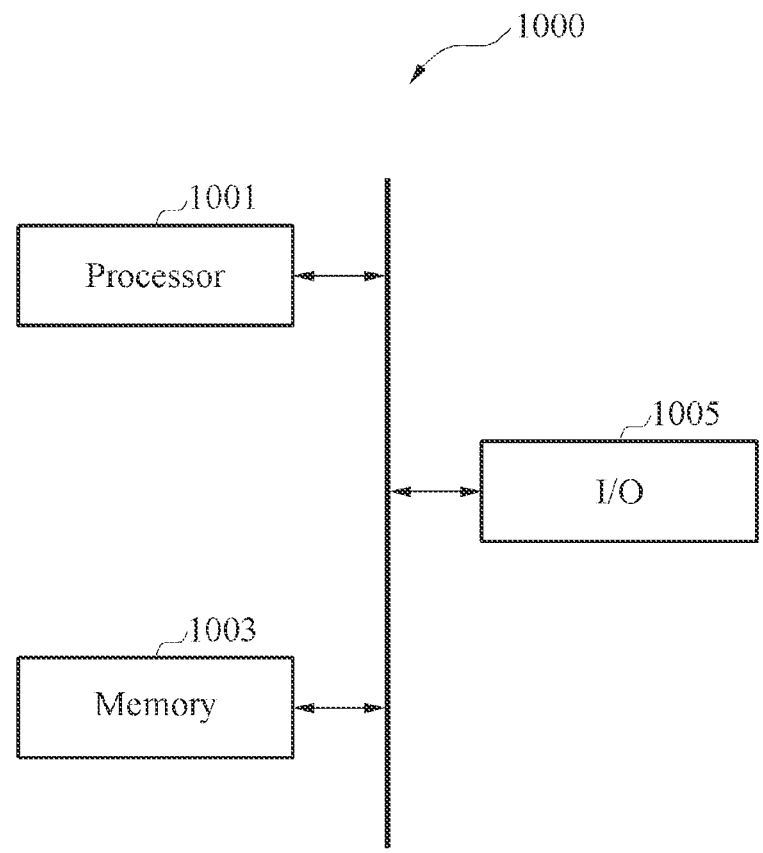
FIG. 10 illustrates an example of a configuration of a global localization apparatus.

FIG. 10 illustrates an example of a configuration of a global localization apparatus.

Referring to FIG. 10, a global localization apparatus 1000 may include a processor 1001 (e.g., one or more processors), a memory 1003 (e.g., one or more memories), and an input/output (I/O) device 1005. The global localization apparatus 1000 may include, for example, a user device (e.g., a smartphone, a personal computer (PC), a tablet PC, etc.), AR glasses, and a server.

The memory 1003 in the global localization apparatus 1000 may record a global localization model. The global localization model may include, for example, the global localization model described above with reference to FIGS. 1 to 7, or the global localization model described above with reference to FIGS. 8 and 9. The memory 1003 may be, for example, a volatile memory or a non-volatile memory.

Hereinafter, the global localization model recorded in the memory 1003 will be described as an example of the global localization model described above with reference to FIGS. 1 to 7. In other words, the global localization model may include a first network configured to extract a feature of an input image, a second network configured to estimate a coordinate map of the input image based on an output of the first network, and a pose estimator configured to estimate a pose corresponding to a global localization result based on an output of the second network.

As described above, the global localization model may be generated by a method of training the global localization model. For example, the global localization model may be generated by an operation of obtaining a synthetic data set based on 3D map data, an operation of iteratively back-propagating a gradient obtained based on at least one loss associated with the global localization model to update parameters of a neural network included in the global localization model, and an operation of storing the parameters of the neural network in the memory 1003. In an example, the neural network included in the global localization model may include a first network and a second network, as described above with reference to FIG. 1. In another example, the neural network included in the global localization model may include a first network and a third network, as described above with reference to FIG. 8.

According to an example, the memory 1003 may store a program in which the above-described global localization model is implemented, and the processor 1001 may execute the program stored in the memory 1003 and control the global localization apparatus 1000. For example, the processor 1001 may obtain the feature of the input image which is output from the first network by applying the input image to the first network, may obtain a coordinate map that corresponds to the input image and that is output from the second network by applying the feature to the second network, and may obtain a pose that corresponds to the input image and that is output from the pose estimator based on the coordinate map. The processor 1001 may perform any or all operations described above with reference to FIGS. 1-9.

The global localization apparatus 1000 may be connected to an external device (e.g., a PC, a server, or a network) through the I/O device 1005 to exchange data with the external device. For example, the global localization apparatus 1000 may receive an image through the I/O device 1005, and may output a pose estimated based on an image that is a result of the global localization model.

The global localization apparatuses, processors, memories, I/O devices, global localization apparatus 1000, processor 1001, memory 1003, I/O device 1005, and other devices, apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with global localization, the method comprising:

extracting a feature by applying an input image to a first network;

estimating a coordinate map corresponding to the input image by applying the extracted feature to a second network; and estimating a pose corresponding to the input image based on the estimated coordinate map, wherein either one or both of the first network and the second network is trained based on either one or both of:

a first generative adversarial network (GAN) loss determined based on a first feature extracted by the first network based on a synthetic image determined by three-dimensional (3D) map data and a second feature extracted by the first network based on a real image; and a second GAN loss determined based on a first coordinate map estimated by the second network based on the first feature and a second coordinate map estimated by the second network based on the second feature.

2. The method of claim 1, wherein either one or both of the first network and the second network is trained further based on either one or both of:

a first loss determined based on the first coordinate map and ground truth data corresponding to the synthetic image; and a second loss determined based on a first pose estimated based on the first coordinate map and the ground truth data corresponding to the synthetic image.

3. The method of claim 2, wherein the ground truth data comprises a pose of a virtual camera that captures the synthetic image and 3D coordinate data corresponding to each pixel of the synthetic image.

4. The method of claim 1, wherein the pose comprises a six-degrees-of-freedom (6DoF) pose of a device that captures the input image.

5. A non-transitory computer-readable storage medium storing instructions that, when executed by one or more processors, configure the one or more processors to perform the method of claim 1.

6. A method with global localization, the method comprising:
   determining a synthetic data set based on three-dimensional (3D) map data, the synthetic data set comprising a synthetic image captured by a virtual camera corresponding to an arbitrary pose and 3D coordinate data corresponding to each pixel of the synthetic image;
   determining a first generative adversarial network (GAN) loss based on a first feature determined by applying the synthetic image to the first network and a second feature determined by applying a real image captured by a real camera to the first network;
   determining a second GAN loss based on a first coordinate map determined by applying the first feature to the second network and a second coordinate map determined by applying the second feature to the second network;
   determining a first loss based on the first coordinate map and the 3D coordinate data corresponding to the synthetic image;
   determining a second loss based on a first pose estimated based on the first coordinate map and a pose of the virtual camera; and
   training either one or both of the first network and the second network based on any one or any combination of any two or more of the first loss, the second loss, the first GAN loss, and the second GAN loss.

7. The method of claim 6, wherein the determining of the synthetic data set further comprises:
   extracting the first feature by applying the synthetic image to the first network;
   estimating the first coordinate map corresponding to each pixel of the synthetic image by applying the extracted first feature to the second network;
   estimating a first pose corresponding to the synthetic image based on the estimated first coordinate map;
   extracting the second feature by applying the real image to the first network; and
   estimating the second coordinate map corresponding to each pixel of the synthetic image by applying the extracted second feature to the second network.

8. The method of claim 6, wherein the training of the either one or both of the first network and the second network comprises training the first network and a first discriminator based on the first GAN loss, the first discriminator being configured to discriminate between the first feature extracted from the synthetic image and the second feature extracted from the real image.

9. The method of claim 6, wherein the training of the either one or both of the first network and the second network comprises training the second network and a second discriminator based on the second GAN loss, the second discriminator being configured to discriminate between the first coordinate map estimated from the synthetic image and the second coordinate map estimated from the real image.

10. The method of claim 6, wherein the training of the either one or both of the first network and the second network comprises iteratively back-propagating a gradient determined based on the first loss to the first network and the second network.

11. The method of claim 6, wherein the training of the either one or both of the first network and the second network comprises iteratively back-propagating a gradient determined based on the second loss to the first network and the second network.

12. The method of claim 6, further comprising, in response to the training of the either one or both of the first network and the second network:
   extracting a feature by applying an input image to the first network;
   estimating a coordinate map corresponding to the input image by applying the extracted feature to the second network; and
   estimating a pose corresponding to the input image based on the estimated coordinate map.

13. An apparatus with global localization, the apparatus comprising:
   one or more processors configured to:
   extract a feature by applying an input image to a first network of a global localization model;
   estimate a coordinate map of the input image by applying the extracted feature to a second network of the global localization model; and
   estimate a pose corresponding to a global localization result by applying the estimated coordinate map to a pose estimator of the global localization model,
   wherein the global localization model is generated by:
   determining a synthetic data set based on three-dimensional (3D) map data, the synthetic data set comprising a synthetic image captured by a virtual camera corresponding to an arbitrary pose and 3D coordinate data corresponding to each pixel of the synthetic image; and
   iteratively back-propagating a gradient determined based on one or more losses associated with the global localization model, to update parameters of the first network and the second network; and
   wherein a loss associated with the global localization model comprises either one or both of:
   a first generative adversarial network (GAN) loss determined based on a first feature extracted by the first network based on the synthetic image and a second feature extracted by the first network based on a real image; and
   a second GAN loss determined based on a first coordinate map estimated by the second network based on the first feature and a second coordinate map estimated by the second network based on the second feature.

14. The apparatus of claim 13, wherein the loss associated with the global localization model further comprises:
   a first loss determined based on the first coordinate map and ground truth data corresponding to the synthetic image; and
   a second loss determined based on a first pose estimated by the pose estimator based on the first coordinate map, and the ground truth data corresponding to the synthetic image.

15. The apparatus of claim 13, wherein
the iteratively back-propagating of the gradient comprises:

iteratively back-propagating a gradient determined by inputting the first feature to a first discriminator to the first discriminator and the first network, based on the first GAN loss; and iteratively back-propagating a gradient determined by inputting the second feature to the first discriminator to the first discriminator and the first network, based on the first GAN loss, and the first discriminator comprises a neural network configured to output a value indicating the synthetic image based on the first feature extracted from the synthetic image and output a value indicating the real image based on the second feature extracted from the real image.

16. The apparatus of claim 13, wherein the iteratively back-propagating of the gradient comprises:

iteratively back-propagating a gradient determined by inputting the first coordinate map to a second discriminator to the second discriminator and the second network, based on the second GAN loss; and iteratively back-propagating a gradient determined by inputting the second coordinate map to the second discriminator to the second discriminator and the second network, based on the second GAN loss, and the second discriminator comprises a neural network configured to output a value indicating the synthetic image based on the first coordinate map estimated from the synthetic image and output a value indicating the real image based on the second coordinate map estimated from the real image.

17. The apparatus of claim 13, further comprising a memory storing instructions that, when executed by the one or more processors, configure the one or more processors to perform the extracting of the feature, the estimating of the coordinate map, and the estimating of the pose.

18. A non-transitory computer-readable storage medium storing a global localization model, wherein the global localization model is generated by:

determining a synthetic image captured by a virtual camera corresponding to an arbitrary pose and three-dimensional (3D) coordinate data corresponding to each pixel of the synthetic image, based on 3D map data;

iteratively back-propagating a gradient determined based on one or more losses associated with the global localization model, to update parameters of a neural network included in the global localization model; and storing the parameters of the neural network in the non-transitory computer-readable storage medium, wherein the neural network included in the global localization model comprises:

a first network configured to extract a feature of an input image; and a second network configured to estimate a coordinate map of the input image based on an output of the first network, and wherein the one or more losses associated with the global localization model comprises either one or both of:

a first generative adversarial network (GAN) loss determined based on a first feature extracted by the first network based on the synthetic image and a second feature extracted by the first network based on a real image; and a second GAN loss determined based on a first coordinate map estimated by the second network based on the first feature and a second coordinate map estimated by the second network based on the second feature.

19. The non-transitory computer-readable storage medium of claim 18, wherein the one or more losses associated with the global localization model further comprises:

a first loss determined based on the first coordinate map and ground truth data corresponding to the synthetic image; and a second loss determined based on a first pose estimated based on the first coordinate map, and the ground truth data corresponding to the synthetic image.

20. The non-transitory computer-readable storage medium of claim 18, wherein the iteratively back-propagating of the gradient comprises:

iteratively back-propagating a gradient determined by inputting the first feature to a first discriminator to the first discriminator and the first network, based on the first GAN loss; and iteratively back-propagating a gradient determined by inputting the second feature to the first discriminator to the first discriminator and the first network, based on the first GAN loss, and the first discriminator comprises a neural network configured to output a value indicating the synthetic image based on the first feature extracted from the synthetic image and output a value indicating the real image based on the second feature extracted from the real image.

21. The non-transitory computer-readable storage medium of claim 18, wherein the iteratively back-propagating of the gradient comprises:

iteratively back-propagating a gradient determined by inputting the first coordinate map to a second discriminator to the second discriminator and the second network, based on the second GAN loss; and iteratively back-propagating a gradient determined by inputting the second coordinate map to the second discriminator to the second discriminator and the second network, based on the second GAN loss, and the second discriminator comprises a neural network configured to output a value indicating the synthetic image based on the first coordinate map estimated from the synthetic image and output a value indicating the real image based on the second coordinate map estimated from the real image.

* * * * *